(12) United States Patent
Shimada et al.

(10) Patent No.: US 8,646,556 B2
(45) Date of Patent: Feb. 11, 2014

(54) ENGINE HOOD FOR CONSTRUCTION MACHINE

(75) Inventors: Yoshiaki Shimada, Hirakata (JP); Naoki Tsujimoto, Yawata (JP); Yuuji Shiomoto, Suita (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/516,910

(22) PCT Filed: Jan. 18, 2011

(86) PCT No.: PCT/JP2011/050779
§ 371 (c)(1),
(2), (4) Date: Jun. 18, 2012

(87) PCT Pub. No.: WO2011/093175
PCT Pub. Date: Aug. 4, 2011

(65) Prior Publication Data
US 2012/0255801 A1  Oct. 11, 2012

(30) Foreign Application Priority Data
Jan. 26, 2010 (JP) .................................. 2010-014288

(51) Int. Cl.
*B62D 25/10* (2006.01)
(52) U.S. Cl.
USPC ...................................................... 180/69.2
(58) Field of Classification Search
USPC ............... 180/69.2, 69.21, 69.24; 296/193.11
See application file for complete search history.

(56) References Cited

U.S. PATENT DOCUMENTS 5,435,406 A * 7/1995 Gaffoglio et al. .......... 180/69.21
(Continued)

FOREIGN PATENT DOCUMENTS

| CN | 101403219 A | 4/2009 |
| JP | 64-78981 A | 3/1989 |

(Continued)

OTHER PUBLICATIONS

International Search Report of corresponding PCT Application No. PCTIJP2011/050779.
(Continued)

*Primary Examiner* — John Walters
*Assistant Examiner* — Brian Swenson
(74) *Attorney, Agent, or Firm* — Global IP Counselors, LLP

(57) ABSTRACT

An engine hood for a construction machine is configured to be pivoted in a vehicle body back-and-forth direction about a hinge attached as a pivot center to a longitudinal side part of a counterweight. The engine hood includes an engine hood main body, a first operating force applying unit and a second operating force applying unit. The engine hood main body is attached to a vehicle body of the construction machine in a pivotably openable/closable state. The first operating force applying unit is configured to apply force in a direction of opening the engine hood main body until the engine hood main body reaches a vicinity of a predetermined opening angle. The second operating force applying unit is configured to apply force in a direction of closing the engine hood main body when the engine hood main body is pivoted at the predetermined opening angle or greater.

7 Claims, 11 Drawing Sheets

(56) References Cited

U.S. PATENT DOCUMENTS

| | | | |
|---|---|---|---|
| 5,465,803 A * | 11/1995 | Kircher et al. | 180/69.21 |
| 5,538,097 A * | 7/1996 | Stauffer et al. | 180/69.21 |
| 6,213,235 B1 * | 4/2001 | Elhardt et al. | 180/69.2 |
| 6,460,644 B1 * | 10/2002 | Smith et al. | 180/89.17 |
| 6,848,525 B1 * | 2/2005 | Peterson | 180/69.2 |
| 7,377,561 B2 * | 5/2008 | Shin | 292/262 |
| 7,926,603 B2 * | 4/2011 | Bonsen | 180/69.21 |
| 7,992,665 B2 * | 8/2011 | Giovannini et al. | 180/69.2 |
| 8,096,379 B2 * | 1/2012 | Marsolek et al. | 180/69.24 |
| 2006/0086551 A1 * | 4/2006 | Cleland et al. | 180/69.2 |
| 2009/0084004 A1 | 4/2009 | Kim | |
| 2010/0206526 A1 * | 8/2010 | Yabe et al. | 165/121 |
| 2010/0236855 A1 * | 9/2010 | Matsushita et al. | 180/69.2 |

FOREIGN PATENT DOCUMENTS

| | | |
|---|---|---|
| JP | 8-326099 A | 12/1996 |
| JP | 9-177127 A | 7/1997 |
| JP | 2000-204595 A | 7/2000 |
| JP | 2004-345555 A | 12/2004 |
| JP | 2009-084999 A | 4/2009 |
| JP | 2009-113658 A | 5/2009 |

OTHER PUBLICATIONS

Chinese Office Action issue on Sep. 16, 2013 for the corresponding Chinese application No. 201180005101.2.

* cited by examiner

A-A

B-B (a)

(b)

(a)

(b)

ENGINE HOOD FOR CONSTRUCTION MACHINE

CROSS-REFERENCE TO RELATED APPLICATIONS

This application claims priority to Japanese Patent Application No. 2010-014288 filed on Jan. 26, 2010, the disclosure of which is hereby incorporated herein by reference in its entirety.

TECHNICAL FIELD

The present invention relates to an engine hood mounted to a vehicle body of a construction machine such as a hydraulic excavator.

BACKGROUND ART

In recent years, construction machines have generally employed a structure that a power compartment accommodating a power source and etc. is covered with an exterior cover for blocking out noise generated in the power compartment.

Meanwhile, regular maintenance checks are required for the power source accommodated within the power compartment covered with the exterior cover, and in some instances, an urgent maintenance work and etc. may be required for the power source. In such cases, it is remarkably inefficient to perform a work, for instance, by detaching the exterior cover fixed to a frame by means of fastening members (e.g., bolts, nuts and etc.) on a necessary basis. This may become a burden on an operator.

In view of the above, an opening/closing mechanism for an engine hood attached for covering the top surface of an exterior cover has been proposed for making it possible to easily perform a maintenance work and etc. for the inside of the exterior cover even when the maintenance work and etc. are required for devices and etc. accommodated within the power compartment.

For example, Japan Laid-open Patent Application Publication No. JP-A-H08-326099 (published on Dec. 10, 1996) describes a machine compartment cover opening device for a construction machine, which is provided with two gas springs for applying push-up force in the same direction.

On the other hand, Japan Laid-Open Patent Application Publication No. JP-H09-177127 (published on Jul. 8, 1997) describes a machine compartment cover for a construction machine, which is provided with two gas springs respectively having a good balance in spring force and configured to generate roughly equal push-up force and roughly equal stroke amount in releasing the cover.

SUMMARY

However, the aforementioned well-known engine hoods for a construction machine have the following drawbacks.

Specifically, in the construction machine engine hoods described in the aforementioned publications, two gas cylinders provided therein are either configured to apply thrust in the same direction or are supplementary disposed. Therefore, force may be applied in a direction of opening the engine hood when the position of the center of mass of the engine hood is moved across a vertical line of a pivot center of the engine hood in the course of an opening action of the engine hood. An operator is herein supposed to receive total force of the weight of the engine hood and thrust of the gas springs under the structure that only the gas springs are provided for applying force in a direction of supporting (i.e., opening) the engine hood. Therefore, large load may be applied to an operator.

It is an object of the present invention to provide an engine hood for a construction machine, which can be smoothly opened and closed without increasing load applied to an operator regardless of the opening angle of the engine hood.

An engine hood for a construction machine according to a first aspect of the present invention is configured to be pivoted in a vehicle body back-and-forth direction about a hinge attached as a pivot center to a longitudinal side part of a counterweight. The engine hood includes an engine hood main body, a first operating force applying unit and a second operating force applying unit. The engine hood main body is attached to a vehicle body of the construction machine in a pivotably openable/closable state. The first operating force applying unit is configured to apply force in a direction of opening the engine hood main body until the engine hood main body reaches a vicinity of a predetermined opening angle. The second operating force applying unit is configured to apply force in a direction of closing the engine hood main body when the engine hood main body is pivoted at the predetermined opening angle or greater.

According to the engine hood for a construction machine of the first aspect of the present invention, a plurality of operating force applying units configured to apply force in opposite directions are provided in the engine hood that is configured to be opened and closed while being supported by the thrust force of the operating force applying units.

The first operating force applying unit is herein preferably configured to apply support force to the engine hood main body in an opening direction in an opening angle range from the completely closed state of the engine hood main body to an opening angle that the position of the center of mass of the engine hood main body nearly gets across the vertical line of the pivot center. Further, the second operating force applying unit is preferably configured to apply deterrent force to the engine hood main body in a closing direction after the position of the center of mass of the engine hood main body gets across the vertical line of the pivot center.

With the aforementioned configuration, even in largely opening and closing the engine hood main body, it is possible to apply force to the engine hood main body in an appropriate direction by the first and second operating force applying units in a state that force acts in the closing direction by the weight of the engine hood main body, and further, a state that force acts in the opening direction. As a result, an operator can always smoothly open and close the engine hood main body with light load.

An engine hood for a construction machine according to a second aspect of the present invention relates to the engine hood for a construction machine according to the first aspect of the present invention. In the engine hood, a first angle is defined as an opening angle for pivoting the engine hood main body to a predetermined position where a center of mass of the engine hood main body is positioned on a closing side of the engine hood main body with respect to a vertical line of the pivot center, whereas a second angle is defined as an opening angle for pivoting the engine hood main body from the first opening angle to a predetermined position where the center of mass of the engine hood main body is moved across the vertical line of the pivot center. The engine hood main body is herein configured to be opened in two stages of the first opening angle and the second opening angle greater than the first opening angle.

According to the engine hood for a construction machine of the second aspect of the present invention, the opening action of the engine hood main body is executed in two stages of, for instance, the opening degree in performing a normal maintenance work within an engine compartment (i.e., the first opening degree) and the opening degree in attaching or detaching an engine or a radiator in a hung-down state (i.e., the second opening degree).

With the configuration, it is possible to support the opening action of the engine hood main body by the first operating force applying unit in the initial stage of gradually opening the engine hood main body. On the other hand, it is possible to support the weight of the engine hood main body by the second operating force applying unit in the state that the position of the center of mass of the engine hood main body gets across the vertical line of the pivot axis and force acts in a direction of further opening the engine hood main body by the weight of the engine hood main body. Therefore, it is possible to reduce load acting on an operator even when the operator largely opens the engine hood main body.

An engine hood for a construction machine according to a third aspect of the present invention relates to the engine hood for a construction machine according to the second aspect of the present invention. In the engine hood, the first opening angle is roughly 60 degrees and the second opening angle is roughly 90 degrees.

According to the engine hood for a construction machine of the third aspect of the present invention, the first opening angle (roughly 60 degrees) in performing a normal maintenance work within the engine compartment and the second opening angle (roughly 90 degrees) in replacing the engine, the radiator or etc. are respectively set for the two staged opening action of the engine hood main body.

Accordingly, the engine hood main body can be opened by the support force applied from the first operating force applying unit in opening the engine hood main body to a position at the first opening angle (roughly 60 degrees). Further in opening the engine hood main body to a position at the second opening angle (roughly 90 degrees), the engine hood main body can be gradually opened while the weight of the engine hood main body is supported by the second operating force applying unit even when the center of mass of the engine hood main body is pivoted across the vertical line of the pivot center.

An engine hood for a construction machine according to a fourth aspect of the present invention relates to the engine hood for a construction machine according to the second aspect of the present invention. The engine hood further includes a support member and a guide part. The support member is configured to support the engine hood main body in the two stages of the first opening angle and the second opening angle. The guide part includes a guide groove along which a part of the support member is moved in conjunction with a pivot thereof. An end of the support member is coupled to a step that is disposed astride an upper opening of an engine compartment in a vicinity of a center part of the upper opening in a width direction. The guide part is disposed on a back surface side of the engine hood main body while being disposed in a vicinity of a roughly center part of the engine hood main body in the width direction. The guide part includes a first guide groove, a second guide groove and a third guide groove. The first guide groove is a groove along which the part of the support member is moved in opening the engine hood main body from a closed state to the first opening angle. The second guide groove is a groove to which the part of the support member is moved from the first guide groove. The second guide groove locks the part of the support member at around the first opening angle. The third guide groove is a groove along which the part of the support member is moved in opening the engine hood main body from the first opening angle to the second opening angle. The third guide groove locks the part of the support member at the second opening angle.

An engine hood for a construction machine according to a fifth aspect of the present invention relates to the engine hood for a construction machine according to the second aspect of the present invention. In the engine hood, the second operating force applying unit is disposed on a back surface side of the engine hood main body while being disposed in a vicinity of a roughly center part of the engine hood main body in a width direction. The second operating force applying unit includes a tube and a rod allowed to be extended and contacted with respect to the tube. An end of the tube is coupled to a fixation part that is disposed on an inner surface of the engine hood main body. The engine hood further includes a link member disposed on a step. The step is disposed astride an upper opening of an engine compartment in a vicinity of a center part of the upper opening in a width direction. The link member is coupled to an end of the rod.

An engine hood for a construction machine according to a sixth aspect of the present invention relates to the engine hood for a construction machine according to one of the second and third aspects of the present invention. The engine hood further includes a support member. The support member is configured to support the engine hood main body at the first opening degree and the second opening degree. Further, the support member is configured to support difference between weight of the engine hood main body and force applied to the engine hood main body from the first operating force applying unit at the first opening angle. On the other hand, the support member is configured to support difference between the weight of the engine hood main body and force applied to the engine hood main body from the second operating force applying unit at the second opening angle.

According to the engine hood for a construction machine of the sixth aspect of the present invention, thrust force and deterrent force can be respectively applied by the first and second operating force applying units, for instance, before and after the position of the center of mass of the engine hood main body gets across the vertical line of the pivot center in gradually opening the engine hood main body.

It should be noted that difference between the weight of the engine hood main body and the force applied from the respective operating force applying units may be set to be zero.

Accordingly, an operator can smoothly open the engine hood main body constantly with light load using the plural operating force applying units configured to apply force in opposite directions regardless of whether or not the position of the center of mass of the engine hood main body gets across the vertical line of the pivot center.

DESCRIPTION OF THE EMBODIMENTS

A hydraulic excavator (construction machine) 1, employing an engine hood according to an exemplary embodiment of the present invention, will be hereinafter explained with reference to FIGS. 1 to 12(b).

Hydraulic Excavator 1

Figure 1:
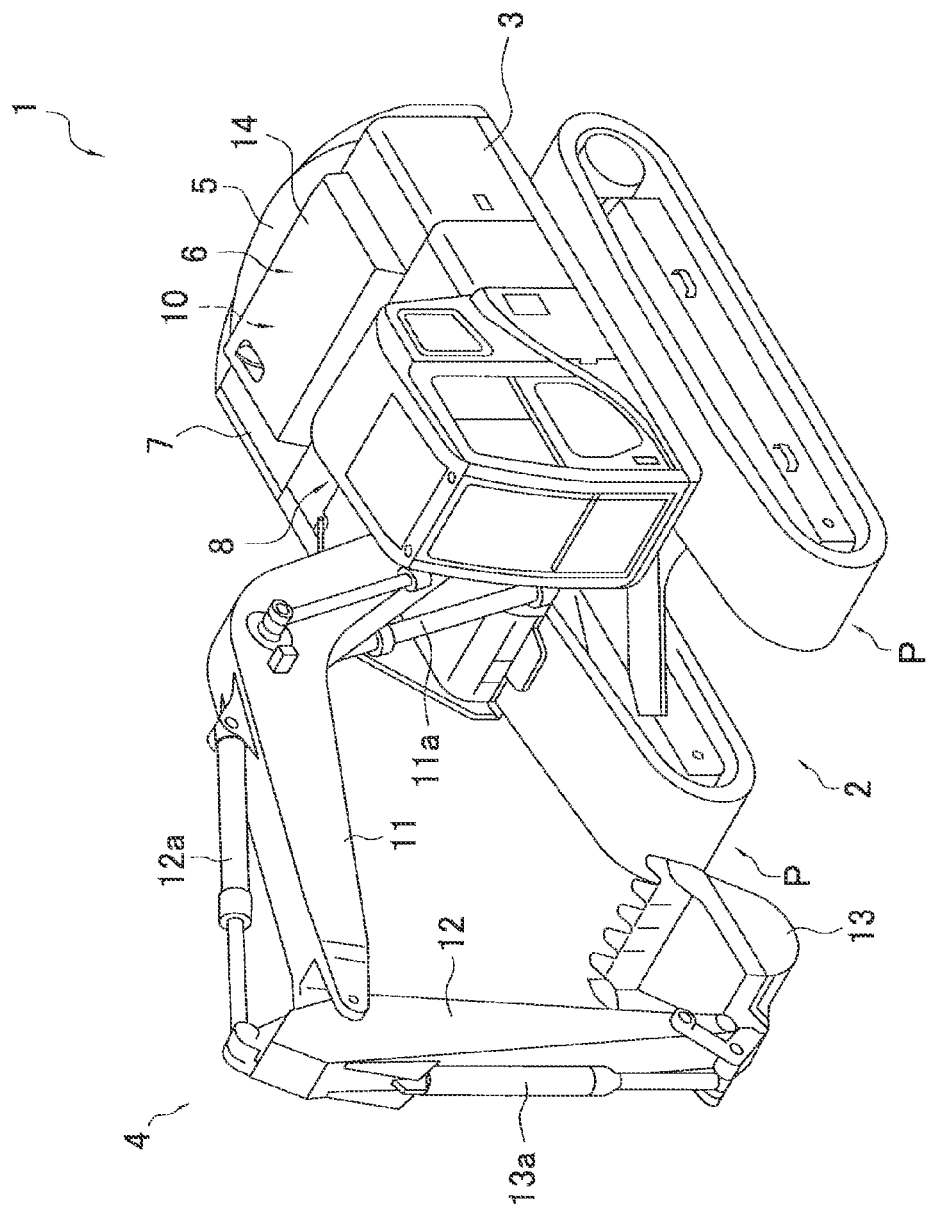
FIG. 1 is a perspective view of the structure of a hydraulic excavator employing an engine hood according to an exemplary embodiment of the present invention.

As illustrated in FIG. 1, the hydraulic excavator 1 according to the present exemplary embodiment includes a lower travelling unit 2, a revolving unit 3, a work implement 4, a counterweight 5, a vehicle body 6, a machine compartment 7 and a cab 8.

The lower travelling unit 2 moves the hydraulic excavator 1 back and forth by circulating a pair of crawler bents P wrapped about the both end portions thereof arranged right and left in a travel direction. Further, the revolving unit 3 is mounted on the top surface of the lower travelling unit 2.

The revolving unit 3 can revolve in arbitrary directions with respect to the lower travelling unit 2. Further, the work implement 4, the counterweight 5, the vehicle body 6 and the cab 8 are mounted on the top surface of the revolving unit 3.

The work implement 4 is structured to include a boom 11, an arm 12 and a bucket 13. The arm 12 is attached to the tip of the boom 11. The bucket 13 is attached to the tip of the arm 12. Further, the work implement 4 is configured to move up and down the boom 11, the arm 12, the bucket 13 and etc. by means of a variety of cylinders 11a, 12a, 13a and etc. included in a hydraulic circuit (not illustrated in the figures) in order to execute earth-sand excavation, sand-gravel excavation and etc. in an earthmoving construction site.

The counterweight 5 is formed by, for instance, solidifying materials (iron scrapes, concrete, etc.) put in a box formed by assembling steel plates. The counterweight 5 is disposed behind the vehicle body 6 on the revolving unit 3 for balancing the vehicle body of the hydraulic excavator 1 in executing excavation and etc.

As illustrated in FIG. 1, the vehicle body 6 is disposed adjacent to the counterweight 5 and includes an engine compartment 10 accommodating therein an engine and etc. Further, the engine compartment 10 includes an upper opening 10a for an inspection (see FIGS. 10 and 11). The upper opening 10a is covered with an engine hood (engine hood main body) 14 that can be opened and closed. The engine hood 14 is configured to be opened and closed by an opening/closing mechanism 20 of the engine hold 14 according to the present exemplary embodiment. It should be noted that the opening/closing mechanism (engine hood) 20 of the engine hood 14 will be described below in detail.

The machine compartment 7 is disposed rearwards of the work implement 4 and accommodates a fuel tank, an operating oil tank, an operated valve and etc. (not illustrated in the figures).

The cab 8 includes an indoor space that an operator of the hydraulic excavator 1 gets on and off. The cab 8 is disposed laterally to the work implement 4, i.e., on the left front part of the revolving unit 3 so that an operator can see the tip portion of the work implement 4.

Opening/Closing Mechanism 20 of Engine Hood 14

The opening/closing mechanism 20 of the engine hood 14 is a mechanism for opening/closing the engine hood 14 attached for covering the upper opening 10a of the engine compartment 10 from/to its closed position on the engine compartment 10.

Figure 2:
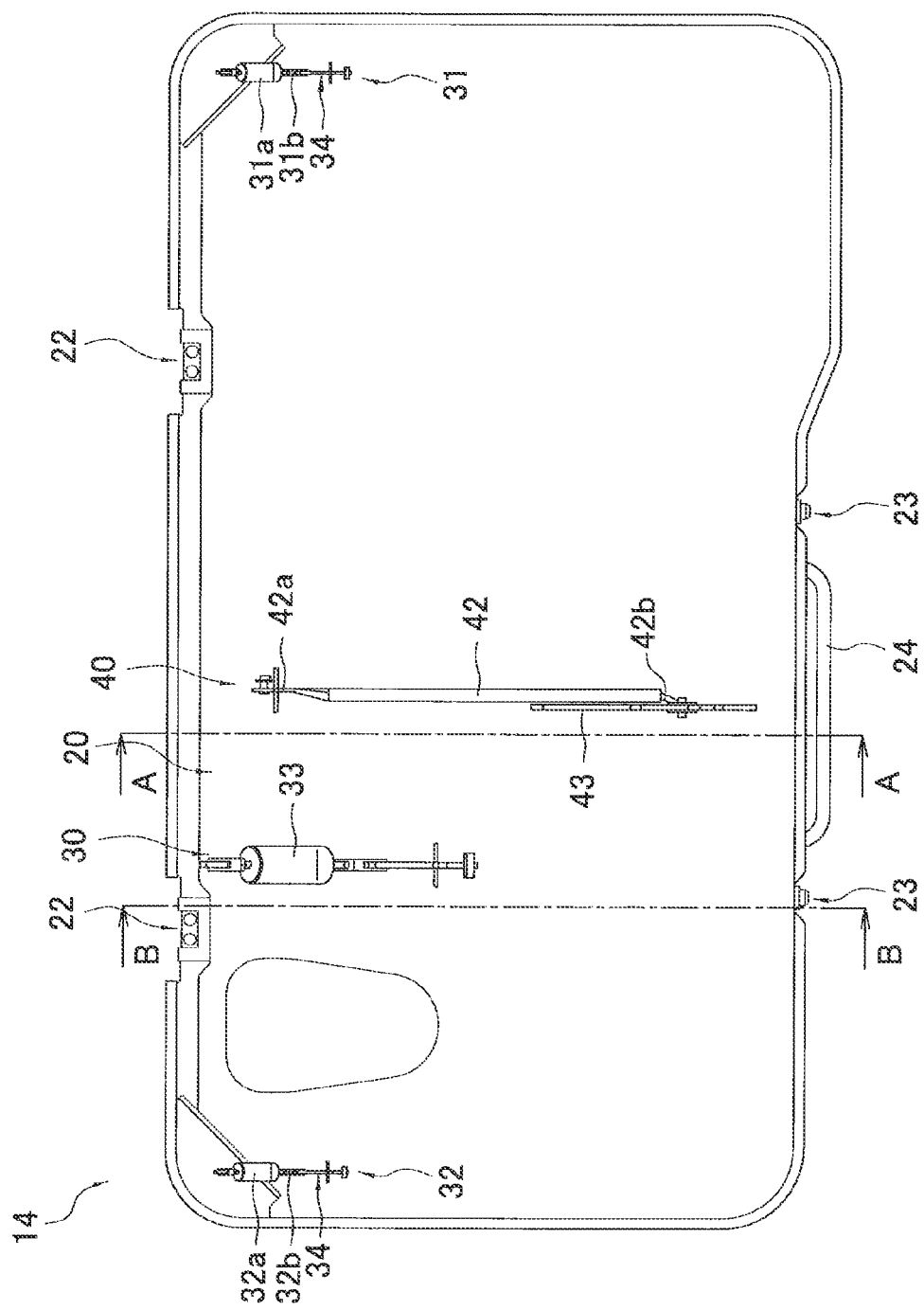
FIG. 2 is a plan view of the internal structure of the engine hood mounted on the hydraulic excavator illustrated in FIG. 1.
Figure 3:
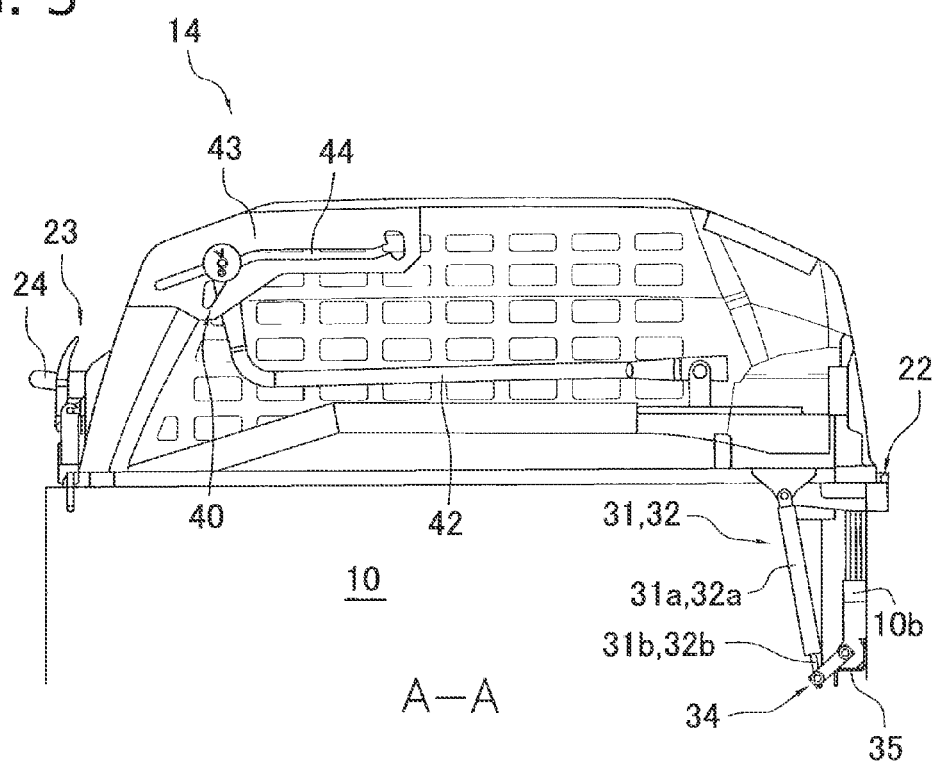
FIG. 3 is a cross-sectional view of the structure of the engine hood illustrated in FIG. 2 sectioned along a line A-A.
Figure 4:
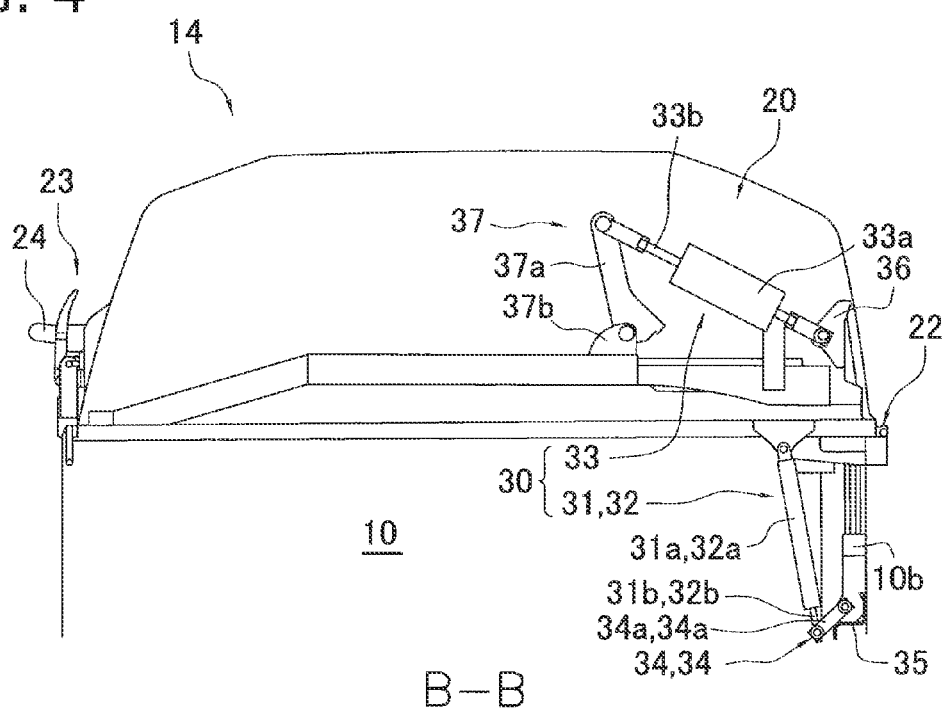
FIG. 4 is a cross-sectional view of the internal structure of the engine hood illustrated in FIG. 2 sectioned along a line B-B.

FIG. 2 illustrates the internal structure of the engine hood. Further, FIGS. 3 and 4 are cross-sectional views of FIG. 2 sectioned along a line A-A and a line B-B, respectively.

The engine hood 14 is a roughly box-shaped lid member. The engine hood 14 is opened and closed, for instance, in executing a maintenance work for the engine, a radiator and etc. disposed within the engine compartment 10. The engine hood 14 is configured to be opened and closed about a hinge 22 as a pivot center attached to a longitudinal edge side of the counterweight 5 in the back-and-forth direction.

A pair of lock parts 23 is attached to a cab 8 side surface of the engine hood 14. The lock parts 23 fix the engine hood 14 to the top surface of the engine compartment 10 for preventing the engine hood 14 set to be in a closed state from shifting to an opened state.

A handle 24 is disposed between the pair of lock parts 23 on the engine hood 14. The handle 24 is used as a part to be held in opening and closing the engine hood 14.

As illustrated in FIGS. 2, 3 and 4, the opening/closing mechanism 20 of the engine hood 14 mainly includes the engine hood 14, a gas spring support mechanism 30 and a stay support mechanism 40.

Gas Spring Support Mechanism 30

As illustrated in FIGS. 2, 3 and 4, the gas spring support mechanism 30 includes a pair of structures (first gas springs (first operating force applying unit) 31 and 32) and a spring mechanism (second operating force applying unit) 33. The paired structures are disposed on the both sides of the engine hood 14, while the spring mechanism 33 is disposed roughly in a center part within the engine hood 14 in the width direction.

The left side in FIGS. 3 and 4 herein corresponds to the front side of the hydraulic excavator 1, and simultaneously, an opening side of the engine hood 14. On the other hand, the right side in FIGS. 3 and 4 corresponds to the rear side of the hydraulic excavator 1, and simultaneously, a closing side of the engine hood 14 where the hinge 22 is disposed as the pivot center of the engine hood 14.

First Gas Springs 31 and 32

The first gas springs 31 and 32 are devices configured to assist the operating force in the first stage of an opening operation for the engine hood 14 by the compression gas within the main body. In other words, the first gas springs 31 and 32 are configured to apply force in the direction of opening the engine hood 14. As illustrated in FIGS. 2, 3 and 4, the first gas springs 31 and 32 are disposed in the vicinity of the both ends of the engine hood 14 in the width direction. In the closed state of the engine hood 14, the first gas springs 31 and 32 are disposed below the engine hood 14 while being disposed in the vicinity of the hinge 22. Link mechanisms 34 and support plates 35 are disposed in the vicinity of the first gas springs 31 and 32. The first gas springs 31 and 32 and the link mechanisms 34 are disposed closer to the engine hood closing side than the hinge 22 is.

It should be noted that the aforementioned first stage of the opening action refers to an action of opening the engine hood 14 from a position at an angle of roughly 0 degrees to a position at an angle of roughly 60 degrees (i.e., a first opening degree).

Each first gas spring 31 (32) has the same structure as a general gas spring. Each first gas spring 31 (32) includes a tube 31a (32a) and a rod 31b (32b) that can be extended and contracted with respect to the tube 31a (32a). As illustrated in FIGS. 3 and 4, first ends of the tubes 31a and 32a of the gas springs 31 and 32 are pivotably coupled to the engine hood 14. On the other hand, second ends of the rods 31b and 32b of the gas springs 31 and 32 are coupled to the link mechanisms 34, respectively.

Each link mechanism 34 (34) includes a link plate 34a (34a). A first end of each link plate 34a (34a) is pivotably coupled to each rod 31b (32b) by means of a pin. A second end of each link plate 34a (34a) is pivotably coupled to an exterior frame 10b of the engine compartment 10 by means of a pin. Accordingly, each link plate 34a (34a) is pivotable about the second end thereof.

Each support plate 35 (35) is fixed to the exterior frame 10b of the engine compartment 10 and makes contact with a part of the corresponding one of the link plates 34a.

When the engine hood 14 is completely closed, the ends of the rods 31b and 32b of the first gas springs 31 and 32 are positioned on the hinge 22 side while being positioned lower than the ends of the tubes 31a and 32a. The first ends of the link plates 34a are positioned on the opposite side of the hinge 22 side while being positioned lower than the second ends thereof. Under the condition, the surface of each link plate 34a (34a), positioned on the opposite side of the first gas spring 31 (32), makes contact with the corresponding support plate 35 (35). With the aforementioned arrangement, reaction force of each first gas spring 31 (32) acts on the engine hood 14, and further, acts on the corresponding support plate 35 (35) via the corresponding link plate 34a (34a).

In executing an inspection of devices (e.g., engine, radiator, etc.) disposed within the engine compartment 10, an operator climbs up to the top surface of the vehicle body 6 and releases the lock parts 23. Subsequently, the operator gradually opens the engine hood 14 while holding the handle 24 of the engine hood 14. The first gas springs 31 and 32 herein assist the operating force of opening the engine hood 14 until the engine hood 14 reaches a position at a predetermined opening angle (of roughly 60 degrees).

Spring Mechanism 33

The spring mechanism 33 is configured to assist the operating force in the second stage of the opening action for the engine hood 14 by means of a spring embedded in the main body thereof. It should be noted that the spring mechanism 33 is different from the first gas springs 31 and 32 in that the spring mechanism 33 is configured to apply force in the direction of closing the engine hood 14 not in the direction of opening the engine hood 14.

It should be noted that the second stage of the opening action in which assist force of the spring mechanism 33 is applied means an opening action of opening the engine hood 14 from a position at an opening angle of roughly 60 degrees (i.e., a first opening angle) to a position at an opening angle of roughly 90 degrees (i.e., a second opening angle).

Figure 10:
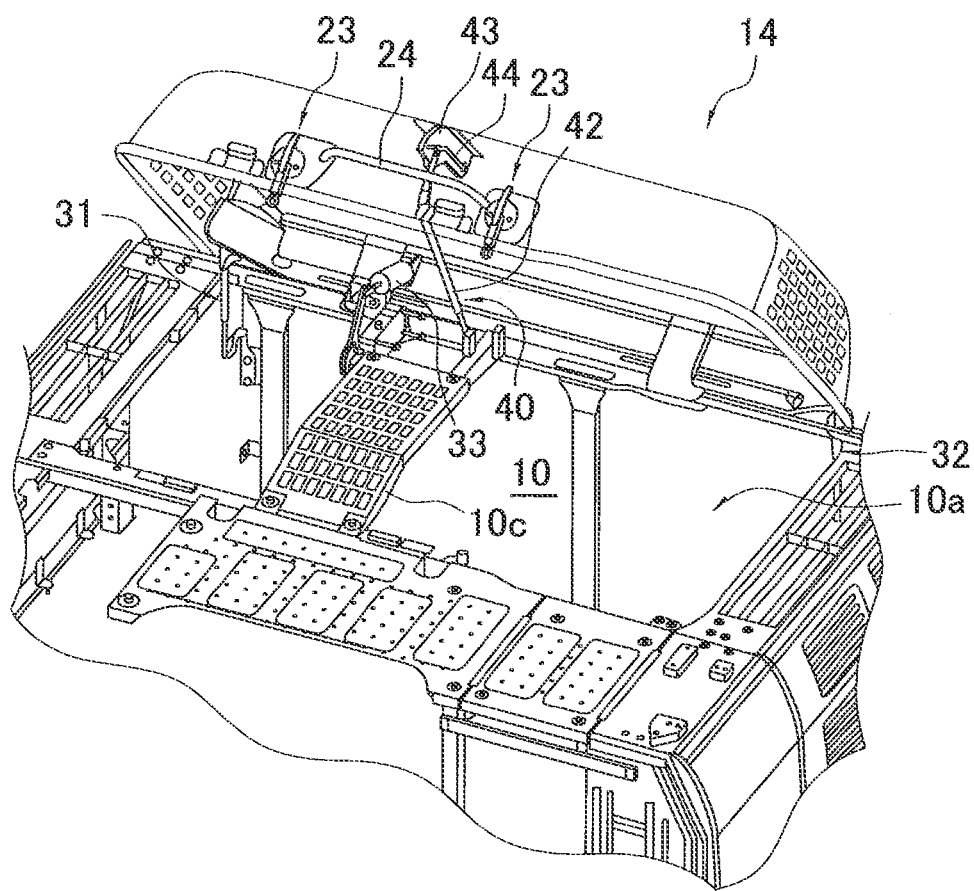
FIG. 10 is a perspective view of the engine hood illustrated in FIG. 2 opened to the position at an angle of 60 degrees.

Further as illustrated in FIG. 10, the spring mechanism 33 is disposed in the vicinity of the center part of the engine hood 14 in the width direction while being disposed on the back surface side of the engine hood 14. As illustrated in FIG. 4, the spring mechanism 33 includes a tube 33a and a rod 33b that can be extended and contracted with respect to the tube 33a. As illustrated in FIG. 10, an end of the tube 33a is pivotably coupled to a fixation part 36 disposed on the inner surface of the engine hood 14. On the other hand, an end of the rod 33b is pivotably coupled to a link mechanism 37. The link mechanism 37 is mounted on a step 10c disposed astride the upper opening 10a of the engine room 10 in the vicinity of the center part of the upper opening 10a in the width direction.

The link mechanism 37 includes a link member 37a and a fixation part 37b. A first end of the link member 37a is pivotably coupled to an end of the rod 33b, while a second end of the link member 37a is pivotably coupled to the fixation part 37b. The fixation part 37b is fixed to the exterior frame 10b. The second end of the link member 37a is pivotably coupled to the fixation part 37b.

Figure 8:
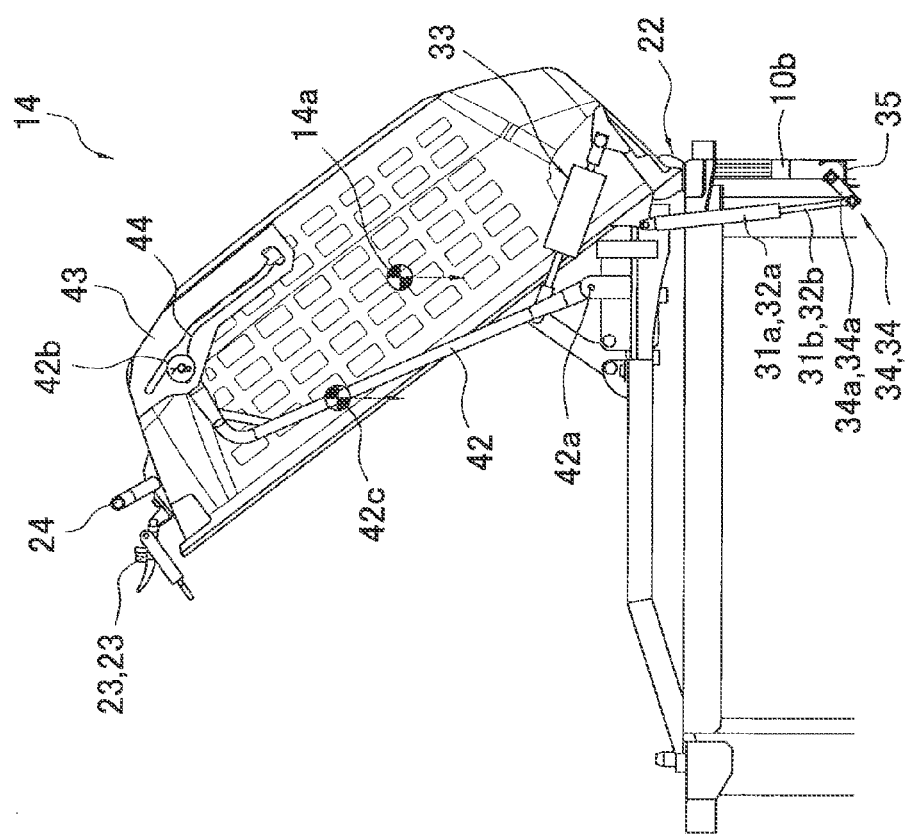
FIG. 8 is a perspective view of the engine hood illustrated in FIG. 2 opened to a position at an angle of 60 degrees.
Figure 9:
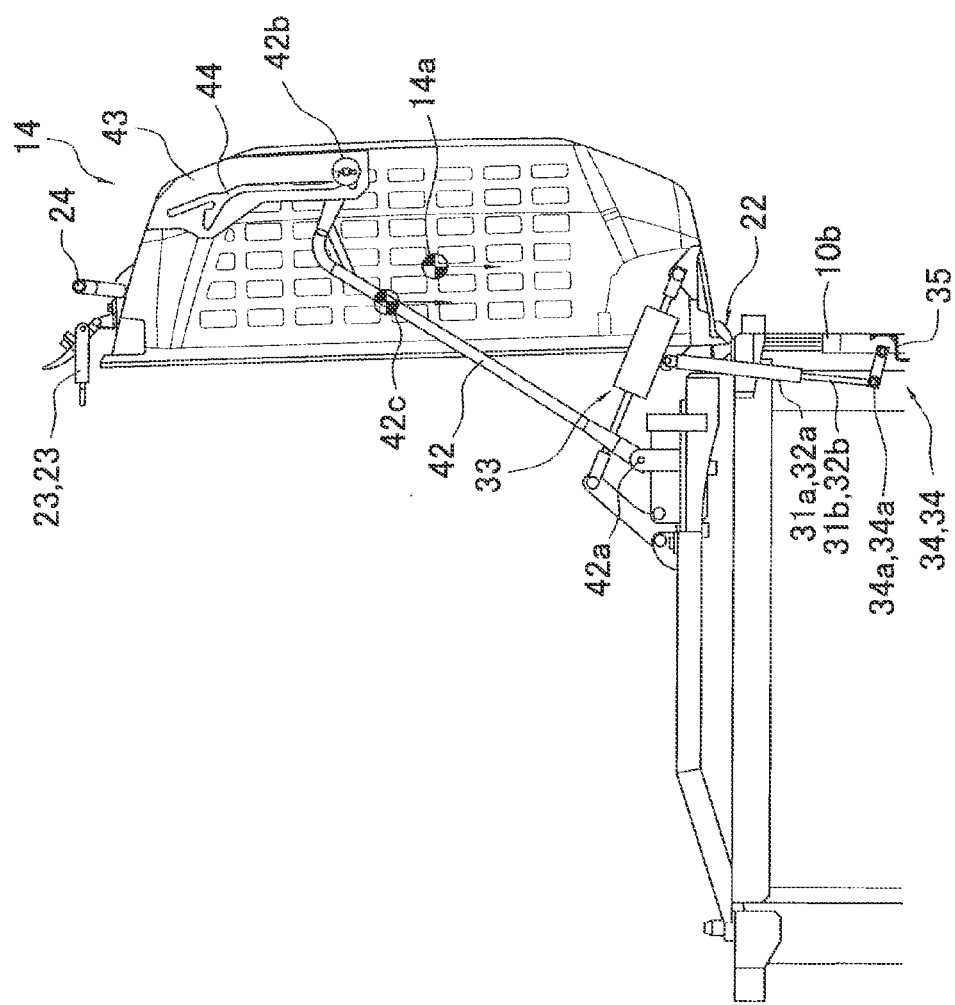
FIG. 9 is a perspective view of the engine hood illustrated in FIG. 2 further opened to a position at an angle of 90 degrees.

In shifting the engine hood 14 from a position at an opening angle of roughly 60 degrees (i.e., the first opening angle) to a position at an angle of roughly 90 degrees (i.e., the second opening angle), the position of a center of mass 14a of the engine hood 14 is moved across the vertical line of the hinge 22 as the pivot center of the engine hood 14 when the opening angle reaches roughly 70 degrees (see FIGS. 8 and 9). The engine hood 14 herein receives gravitational force in a direction of opening the engine hood 14. After the opening angle of the engine hood 14 exceeds roughly 70 degrees, the spring mechanism 33 applies force in a direction of closing the engine hood 14 against the gravitational force acting in a direction of further opening the engine hood 14. Accordingly, it is possible to smoothly open and close the engine hood 14 by reducing operator's burden of supporting the weight of the engine hood 14 regardless of the position of the center of mass 14a of the engine hood 14 in largely opening the engine hood 14.

Stay Support Mechanism 40

The stay support mechanism 40 is a mechanism for limiting the maximum opening angle of the engine hood 14 and inhibiting the engine hood 14 opened at a predetermined angle from being closed by means of involuntary force. As illustrated in FIG. 2, the stay support mechanism 40 is disposed in the center part of the engine hood 14 in the width direction (slightly leftwards of the center in FIG. 2).

The bottom side of FIG. 2 corresponds to the front side of the hydraulic excavator 1, and simultaneously, the opening side of the engine hood 14 where that the handle 24 is disposed. On the other hand, the top side of FIG. 2 corresponds to the rear side of the hydraulic excavator 1, and simultaneously, the closing side of the engine hood 14 where the hinge 22 is disposed as the pivot center of the engine hood 14.

The stay support mechanism 40 mainly includes a stay main body 42 and a guide plate (guide part) 43.

Stay Main Body 42

As illustrated in FIGS. 5(a) and 5(b), the stay main body 42 is a rod-shaped member made of metal and is molded in a roughly L-shape. The stay main body 42 is configured to restrict the pivot of the engine hood 14 when the engine hood 14 is opened to a position at a predetermined opening angle. A first end 42a of the stay main body 42 is pivotably supported by a part of the engine compartment 10. A second end 42b of the stay main body 42 has a columnar shape and is engaged with a guide rail (guide groove) 44 of the guide plate 43 to be described.

Further, the stay main body 42 has a roughly L-shape as described above. Therefore, when the stay main body 42 is attached while the bent portion thereof is directed downwards as illustrated in FIG. 5(a), it is possible to keep the position of the center of mass of the stay main body 42 in the closing side of the engine hood 14 until the opening angle of the engine hood 14 exceeds roughly 70 degrees in a process of opening the engine hood 14. Therefore, in opening the engine hood 14 to a position at the opening angle of the first stage (roughly 60 degrees), force of pivoting down the stay main body 42 acts towards the closing side of the engine hood 14 by the weight of the stay main body 42.

Guide Plate 43

The guide plate 43 is a plate-shaped member attached to the back surface side of the engine hood 14. The guide plate 43 includes the guide rail 44 formed thereon. The second end 42b of the stay main body 42 is guided along the guide rail 44 while being engaged therewith.

Figure 6:
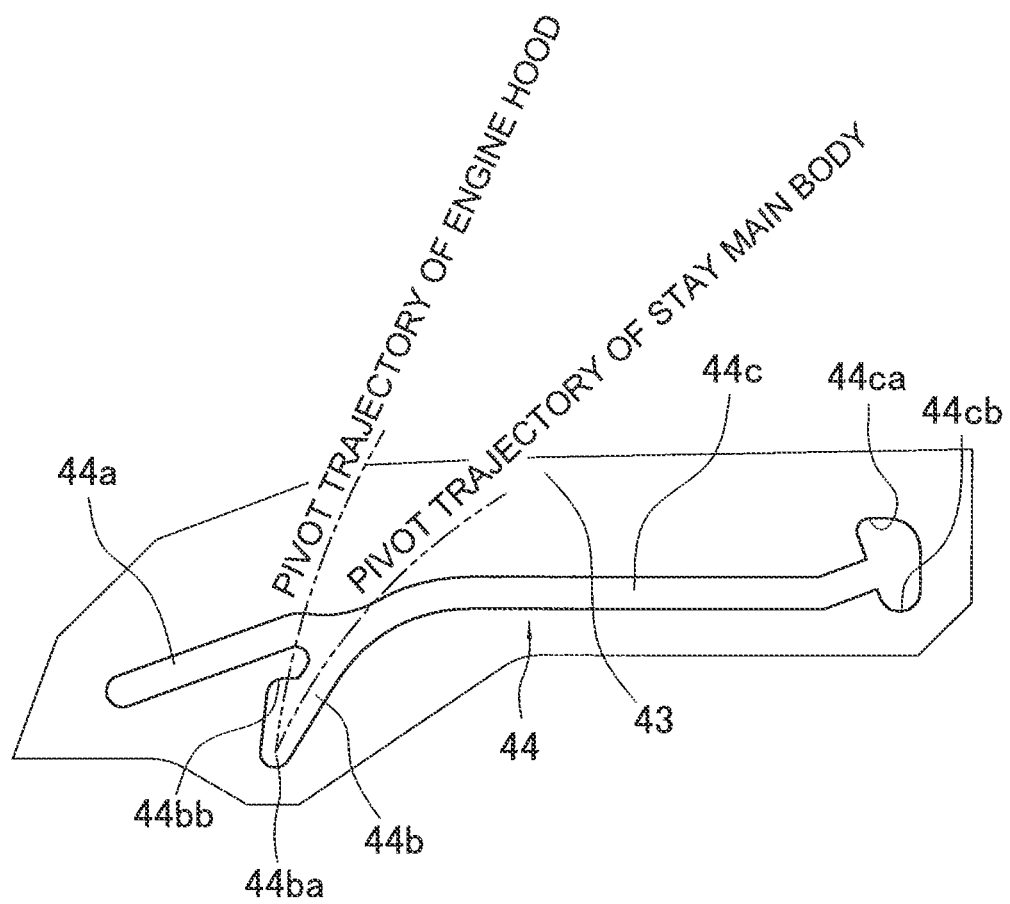
FIG. 6 is an enlarged view of the structure of the guide plate illustrated in FIG. 5.

The guide rail 44 is a slit-shaped guide groove extended in the back-and-forth direction (i.e., the up-and-down direction of FIG. 2) of the engine hood 14. As illustrated in FIG. 6, the guide rail 44 specifically includes a first guide groove 44a, a second guide groove 44b and a third guide groove 44c. The first guide groove 44a is extended in the back-and-forth direction of the hydraulic excavator 1. The second guide groove 44b is downwardly branched from the first guide groove 44a. The third guide groove 44c is a confluent groove of the first and second guide grooves 44a and 44b and is extended in the back-and-forth direction.

Figure 5:
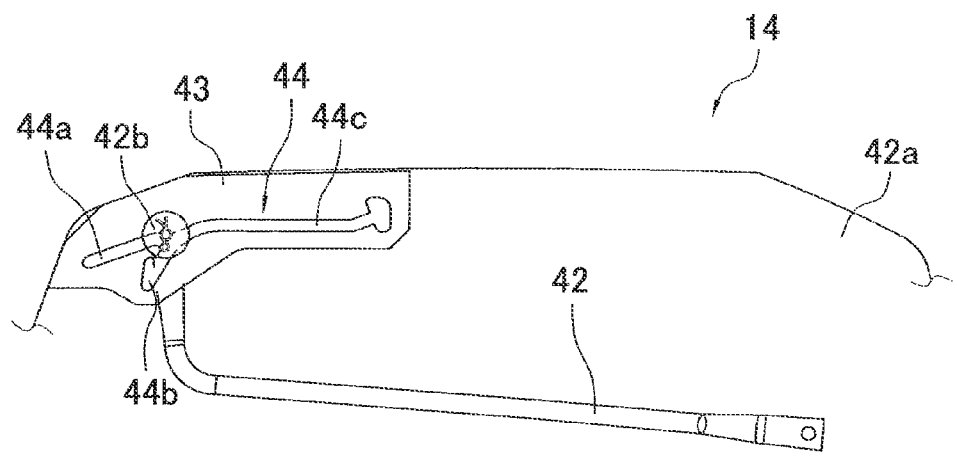
FIG. 5 includes: an internal cross-sectional view (a) of the engine hood illustrated in FIG. 2 for representing the positional relation between a guide plate and a stay support mechanism supporting the engine hood; and a cross-sectional view (b) of the structure of a stay main body of the stay support mechanism illustrated in the view (a).
Figure 5:
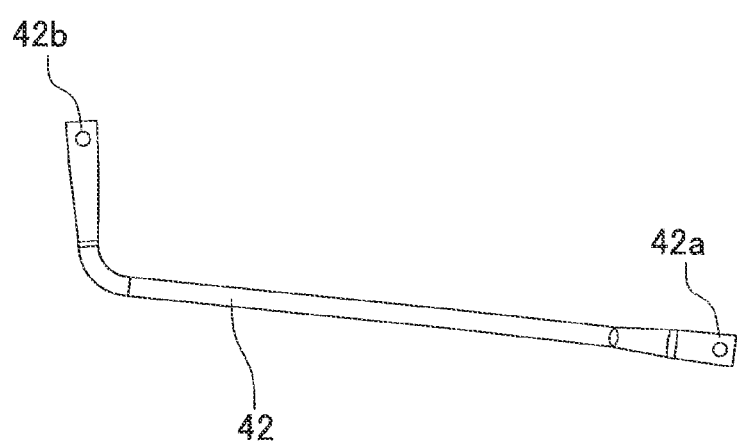

The first guide groove 44a is configured to guide the second end 42b of the stay main body 42 to the rightward in FIG. 6 in gradually opening the engine hood 14 from the closed state to a position nearly at an opening angle of roughly 60 degrees (i.e., the first opening degree) as illustrated in FIG. 5. In other words, the second end 42b of the stay main body 42 is positioned in the left end of the first guide groove 44a in FIG. 6 when the engine hood 14 is positioned in the closed state. In proportion to increase in the opening angle of the engine hood 14, the second end 42b of the stay main body 42 is moved to the rightward in FIG. 6.

The second guide groove 44b is branched from the first guide groove 44a and is formed along the pivot trajectory of the stay main body 42. When the engine hood 14 is opened to a position at an opening angle of roughly 60 degrees (i.e., the first opening angle), the second guide groove 44b guides the second end 42b of the stay main body 42 in an obliquely downward direction in FIG. 6. When the engine hood 14 herein reaches a position at an opening angle of roughly 60 degrees, a center of mass 42c of the stay main body 42 (see FIG. 8) is positioned on the closing side of the engine hood 14 with respect to the vertical line of the pivot center. Therefore, force acts on the stay main body 42 by the weight thereof in a direction of pivoting (pressing down) the stay main body 42 in the counterclockwise direction. The second end 42b is automatically guided from the first guide groove 44a to the second guide groove 44b formed along the pivot trajectory of the stay main body 42 by the pivot of the stay main body 42 due to the weight thereof.

As illustrated in FIG. 6, the second guide groove 44b further includes a holding portion 44ba and a locking portion 44bb. The holding portion 44ba is configured to hold the second end 42b of the stay main body 42 when the engine hood 14 is opened to a position at the first opening angle (of roughly 60 degrees). The locking portion 44bb is formed along the upward pivot direction of the engine hood 14 from the holding portion 44ba disposed at the bottom end of the second guide groove 44b formed along the pivot trajectory of the stay main body 42. In other words, the second end 42b of the stay main body 42 is moved along the pivot trajectory to the holding portion 44ba disposed at the bottom end within the second guide groove 44b while the engine hood 14 is opened to a position at an angle of roughly 60 degrees (i.e., the first opening angle). When force then acts in a direction of closing the engine hood 14, for instance, by wind or etc. under the condition, only the engine hood 14 is pivoted in the closing direction but is restricted from being further pivoted in a position at an opening angle of roughly 55 degrees by the locking portion 44bb formed along the pivot trajectory of the engine hood 14. With the configuration, the engine hood 14 can be supported at an opening angle of roughly 55 degrees even when force of closing the engine hood 14 involuntarily acts while an inspection or etc. is executed for the engine compartment 10.

As illustrated in FIG. 6, the third guide groove 44c is extended from the merged position of the first and second guide grooves 44a and 44b in a roughly horizontal direction when the engine hood 14 is positioned in the closed state. In shifting the opening angle of the engine hood 14 from roughly 60 degrees to roughly 90 degrees, the third guide groove 44c is configured to guide the second end 42b of the stay main body 42 to the end thereof while being engaged with the second end 42b of the stay main body 42.

As illustrated in FIG. 6, the third guide groove 44c further includes a holding portion 44ca and a temporary holding portion 44cb in the right end thereof. When the engine hood 14 reaches a position at an opening angle of roughly 90 degrees (i.e., the second opening angle), the holding portion 44ca is configured to be engaged with the second end 42b of the stay main body 42 that is moved thereto while being guided along the third guide groove 44c. Accordingly, the engine hood 14, opened to a position at an opening angle of roughly 90 degrees, can be supported in the position while being prevented from being further opened from the position. The temporary holding portion 44cb is formed in a direction of disengaging the second end 42b of the stay main body 42 from the holding portion 44ca in closing the engine hood 14 opened to the position at the opening angle of roughly 90 degrees. In other words, the holding portion 44ca and the temporary holding portion 44cb are symmetrically formed up and down from third guide groove 44c as illustrated in FIG. 6. With the structure, an operator is required to manually guide the second end 42b to the extended portion of the third guide groove 44c while holding the stay main body 42 in closing the engine hood 14 from the opened state at the opening angle of roughly 90 degrees. Therefore, it is possible to prevent the operator from involuntarily shifting the engine hood 14 from the opened state at the opening angle of roughly 90 degrees to a closing directional motion.

Opening/Closing Action of Engine Hood 14

Figure 7:
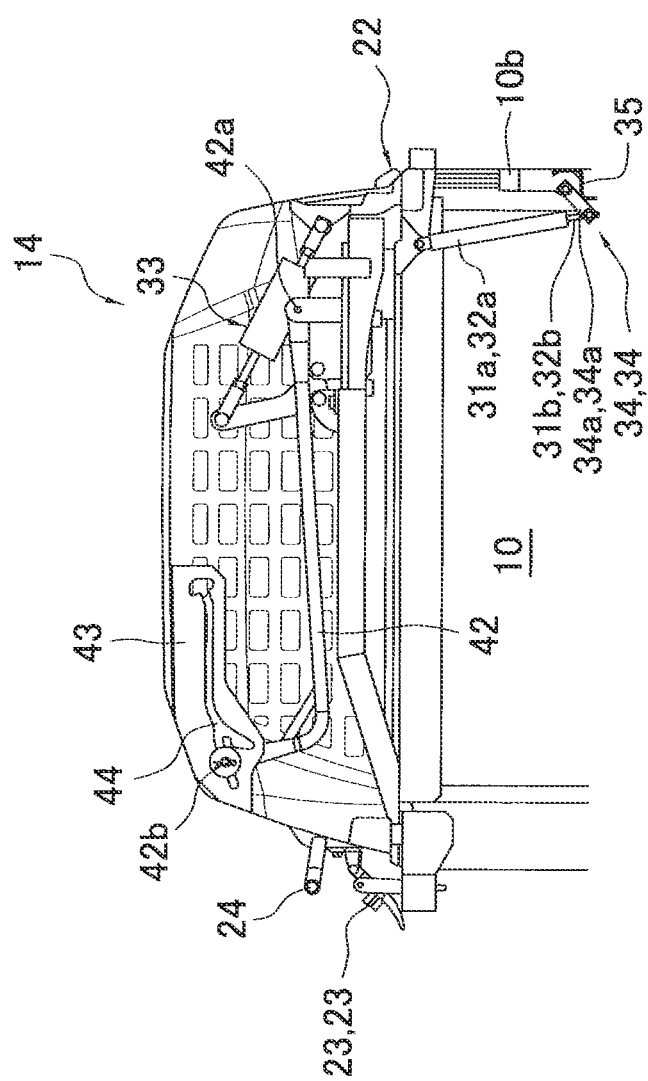
FIG. 7 is a side view of a closed state of the engine hood illustrated in FIG. 2.
Figure 11:
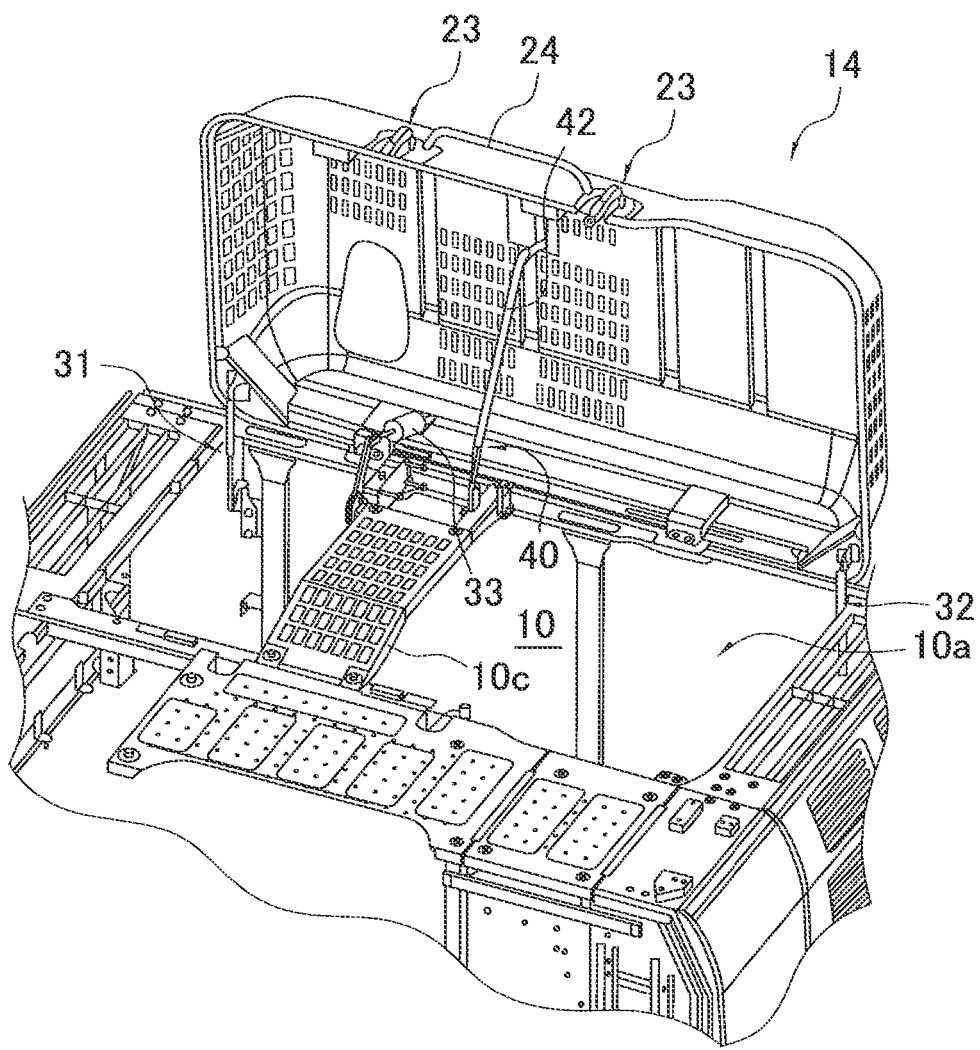
FIG. 11 is a perspective view of the engine hood illustrated in FIG. 2 further opened to the position at an angle of 90 degrees.
Figure 12:
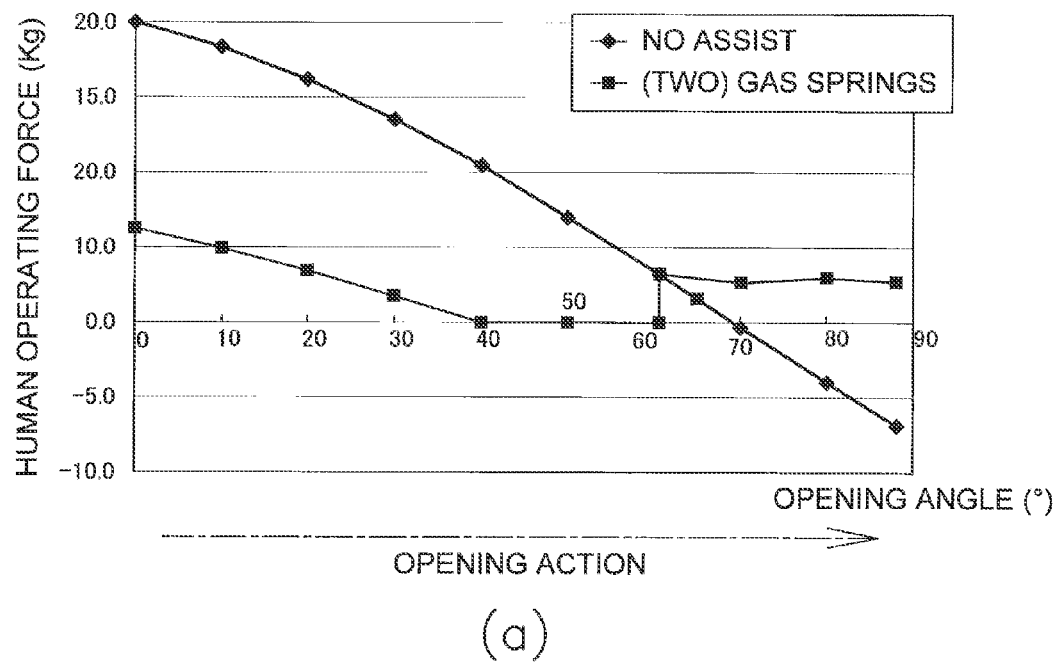
FIG. 12 includes: a chart (a) representing the relation between the opening angle of the engine hood and operating force in gradually opening the engine hood illustrated in FIG. 2; and a chart (b) representing the relation between the opening angle of the engine hood and operating force in gradually closing the engine hood illustrated in FIG. 2.
Figure 12:
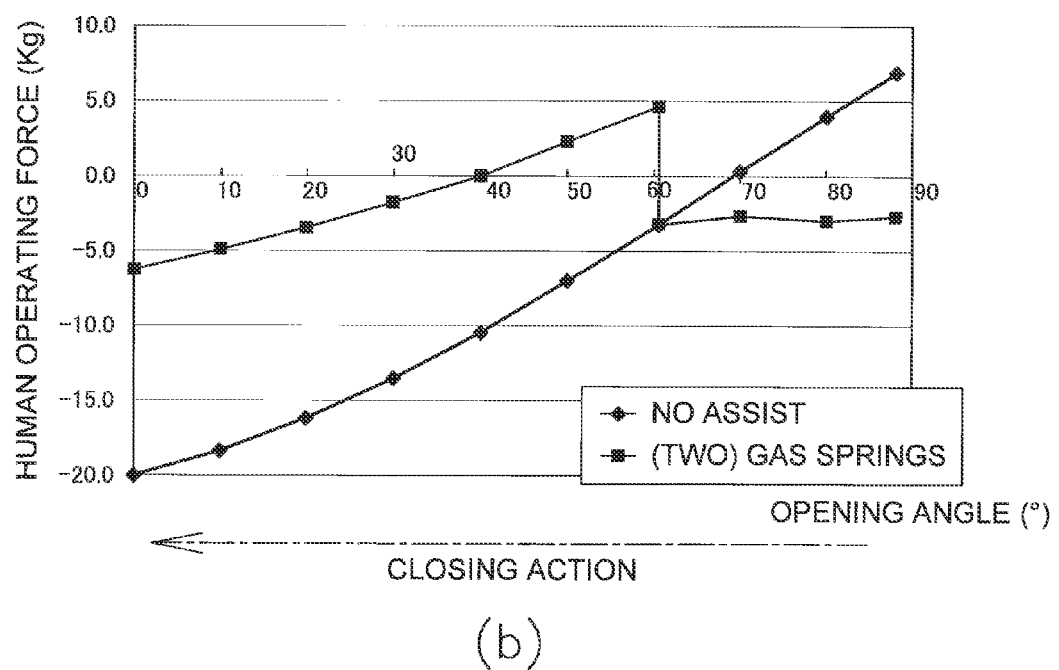

Actions in opening and closing the engine hood 14 will be hereinafter explained with reference to cross-sectional views of FIGS. 7 to 11 and etc. and charts of FIGS. 12(*a*) and 12(*b*). It should be noted that FIG. 7 illustrates a completely closed state of the engine hood 14. Further, FIGS. 8 and 10 illustrate a state of the engine hood 14 opened to a position at an opening angle of roughly 60 degrees (i.e., the first opening angle). Yet further, FIGS. 9 and 11 illustrate a state of the engine hood 14 opened to a position at an opening angle of roughly 90 degrees (i.e., the second opening angle).

(1) Opening Action (1-1) Opening Angle Range 0 to 60 Degrees

First, the second end 42*b* of the stay main body 42 is disposed closer to the end within the first guide groove 44*a* of the guide rail 44 (see FIG. 6) when the engine hood 14 is positioned in a completely closed state as illustrated in FIG. 7. Further, the first gas springs 31 and 32 are most contracted while the rods 31*b* and 32*b* are mostly accommodated within the tubes 31*a* and 32*a*, respectively. On the other hand, the spring mechanism 33 is most contracted on the back surface side of the engine hood 14 while the rod 33*b* is mostly accommodated within the tube 33*a*.

In opening the engine hood 14 from the completely closed state illustrated in FIG. 7, an operator gradually lifts up the engine hood 14 while holding the handle 24 of the engine hood 14. As illustrated in FIG. 8, the operating force of opening the engine hood 14 is herein assisted by the reaction force of the first gas springs 31 and 32 of the gas spring support mechanism 30 until the engine hood 14 reaches a position at an opening angle of roughly 60 degrees (i.e., the first opening angle).

As illustrated in FIGS. 8 and 10, the second end 42*b* of the stay main body 42 is moved from the first guide groove 44*a* to the second guide groove 44*b* (see FIG. 6) whining the guide rail 44 while the engine hood 14 is opened at an opening angle of roughly 60 degrees. The center of mass 42*c* of the stay main body 42 is herein positioned on the closing side of the engine hood 14 from the vertical line of the pivot center of the stay main body 42. Therefore, gravity acts on the stay main body 42 in a direction of downwardly pressing the stay main body 42.

Especially in the present exemplary embodiment, the stay main body 42 having a roughly L-shape is attached while the bent portion thereof is directed downwards. Therefore, the position of the center of mass 42*c* of the stay main body 42 can be kept downward with respect to the vertical line of the pivot center as much as possible. As a result, in gradually opening the engine hood 14, the second end 42*b* of the stay main body 42 can be automatically guided from the first guide groove 44*a* to the second guide groove 44*b* at an opening angle of roughly 60 degrees (i.e., the first opening degree) using force of pressing down the stay main body 42 due to the weight thereof.

Further, the first gas springs 31 and 32 are maximally extended while the rods 31*b* and 32*b* are protruded from the tubes 31*a* and 32*a*, respectively. On the other hand, the spring mechanism 33 is extended to some extent on the back surface side of the engine hood 14 while the rod 33*b* is protruded from the tube 33.

At the opening angle of roughly 60 degrees (i.e., the first opening angle), the engine hood 14 is in a balanced state that gravity acting in a direction of closing the engine hood 14 and the assisting force of the first gas springs 31 and 32 are balanced. In other words, the engine hood 14 is not supported by the stay support mechanism 40 under the condition. When the engine hood 14 is then pivoted in the closing direction due to externally applied force (e.g., wind) of losing the balanced state, the second end 42*b* of the stay main body 42 is moved to the locking portion 44*bb* within the second guide groove 44*b* and the engine hood 14 can be supported while being inhibited from being further pivoted from the position in the closing direction. It should be noted that the second end 42*b* can be smoothly moved to the locking portion 44*bb* when the engine hood 14 is pivoted. This is because the locking portion 44*bb* is formed along the pivot trajectory of the engine hood 14 as described above.

(1-2) Opening Angle Range 60 to 90 Degrees

When the engine hood 14 is opened across the position at an opening angle of roughly 60 degrees (i.e., the first opening degree), the engine hood 14 is gradually pivoted while pulling force does not act on the first gas springs 31 and 32, as illustrated in FIGS. 9 and 11. Especially when being opened at a predetermined opening angle (roughly 70 degrees) or greeter, the engine hood 14 is pivoted to the opening side by the weight thereof while the center of mass 14*a* is moved across the vertical line of the pivot center. Therefore, operating force is not required for an opening action of the engine hood 14 when the engine hood 14 is opened across the position at an opening angle of roughly 70 degrees. On the other hand, the engine hood 14 is configured to spontaneously pivot in the opening direction. Therefore, the spring mechanism 33 is herein extended and its reaction force is applied to the engine hood 14 in the closing direction.

With the structure, an operator is not required to be loaded in supporting and opening the engine hood 14 to a position at an opening angle of roughly 90 degrees, even when a state is produced that the center of mass 14*a* of the engine hood 14 is moved across the vertical line of the pivot center and force acts on the engine hood 14 in the opening direction by the weight of the engine hood 14. As a result, the engine hood 14 can be smoothly opened and closed while the load of the operating force acting on an operator can be constantly reduced regardless of the position of the center of mass 14*a* of the engine hood 14 even in largely pivoting the engine hood 14.

Next, in shifting the engine hood 14 from the position at an opening angle of roughly 60 degrees (i.e., the first opening degree) to the position at an opening degree of roughly 90 degrees (i.e., the second opening degree), the second end 42*b* of the stay main body 42 of the stay support mechanism 40 is moved from the second guide groove 44*b* to the third guide groove 44*c* within the guide rail 44. When the engine hood 14 is then opened to the position at an opening angle of roughly 90 degrees as illustrated in FIGS. 9 and 11, the second end 42*b* is engaged with the holding portion 44*ca* formed in the end of the third guide groove 44*c*. Accordingly, the engine hood 14 cannot be further opened from the position while being supported by the stay support mechanism 40. Further, even when external force involuntarily acts on the engine hood 14 in the closing direction under the condition, the engine hood 14 is prevented from being closed by the engagement between the second end 42b and the holding portion 44ca.

Specifically, when the engine hood 14 is held in the position at an opening angle of roughly 90 degrees (i.e., the second opening angle) as illustrated in FIG. 9 and etc., the reaction force of the spring mechanism 33 in the closing direction of the engine hood 14 is greater than the force acting in the opening direction of the engine hood 14 by means of the weight thereof if these two forces are compared. Therefore, force of holding the second end 42b of the stay main body 42 in the holding portion 44ca within the third guide groove 44c is added for stably supporting the engine hood 14 under the condition. With the structure, the engine hood 14 is supported at an opening angle of roughly 90 degrees (i.e., the second opening angle) in a stable state.

Meanwhile, the first gas springs 31 and 32 are maximally extended while the engine hood 14 is opened to the position at an opening angle of roughly 60 degrees (i.e., the first opening angle). It should be noted that the center of mass 14a of the engine hood 14 is herein positioned on the closing side of the engine hood 14 (i.e., the left side in FIG. 8) with respect to the vertical line of the hinge 22 as the pivot center of the engine hood 14. When the engine hood 14 is further gradually opened to the position at an opening angle of roughly 90 degrees, the first gas springs 31 and 32 are pivoted in conjunction with the action of the engine hood 14 while being maximally extended. In other words, the link plates 34a are pivoted about the first ends thereof while the second ends thereof are pivoted in conjunction with the rods 31b and 32b, as illustrated in FIG. 9.

When the opening angle of the engine hood 14 thus becomes greater than or equal to a predetermined angle and the first gas springs 31 and 32 are maximally extended, pulling force generated in accordance with the pivot of the engine hood 14 does not thereafter act on the first gas springs 31 and 32. Therefore, the first gas springs 31 and 32 are prevented from being easily damaged or broken.

It should be noted that the reaction force from the first gas springs 31 and 32 does not act in closing the engine hood 14 until the engine hood 14 is closed to the position at an opening angle of roughly 60 degrees (i.e., the first opening angle). Therefore, large force is not required for closing the engine hood 14. When the center of mass 14a of the engine hood 14 is then moved to the closing side with respect to the vertical line of the hinge 22 as the pivot center, resistance due to the reaction force of the first gas springs 31 and 32 is thereafter reduced by the action of the force due to the weight of the engine hood 14.

Transition of the operating force required for an operator in gradually opening the engine hood 14 will be hereinafter explained with reference to FIG. 12(a).

Firstly, where the first gas springs 31 and 32 are not provided, an operating force of roughly 20 kg is required for lifting up the engine hood 14 as represented in FIG. 12(a).

By contrast, where two first gas springs 31 and 32 are provided as in the present exemplary embodiment, an operating force of roughly 12 kg is only required due to the assistance of the first gas springs 31 and 32 as represented in FIG. 12(a). The operating force required for an operator is then reduced in proportion to increase in the opening angle of the engine hood 14. The operating force becomes "0" when the opening angle is roughly 40 degrees. Subsequently, the engine hood 14 is automatically shifted to the position at an opening angle of roughly 60 degrees (i.e., the first opening angle) by the first gas springs 31 and 32.

Next, in further gradually opening the engine hood 14, having reached the position at an opening angle of roughly 60 degrees (i.e., the first opening angle), to the position at an opening angle of roughly 90 degrees (i.e., the second opening angle), the first gas springs 31 and 32 have been completely extended at an opening angle of roughly 60 degrees (i.e., the first opening angle), and therefore, force of gradually opening the engine hood 14 is not applied to the engine hood 14. Accordingly, an operating force of roughly 5 to 8 kg is required in the early stage of starting moving the engine hood 14 as represented in FIG. 12(a).

Subsequently, an operator can open the engine hood 14 to the position at an opening angle of roughly 90 degrees with an operating force of roughly 8 kg while being supported by the reaction force of the spring mechanism 33.

(2) Closing Action

Next, in closing the engine hood 14 opened to the position at an opening angle of roughly 90 degrees (i.e., the second opening angle), an operator pulls the stay main body 42 to the operator's side and pivoting down the engine hood 14 to the forward. Accordingly, the second end 42b of the stay main body 42 is disengaged from the holding portion 44ca of the third guide groove 44c and is moved to the extended portion of the third guide groove 44c. Therefore, the engine hood 14 can be pivoted to the closing side.

The third guide groove 44c herein includes the temporary holding portion 44cb formed on the opposite side of the holding portion 44ca. Therefore, an operator is required to reliably guide the second end 42b of the stay main body 42 to the extended portion of the third guide groove 44c in a manual manner when trying to close the engine hood 14 opened to the position at an opening angle of roughly 90 degrees (i.e., the second opening degree). With the structure, it is possible to prevent the engine hood 14 from pivoting in the closing direction against operator's intension.

Next, the spring mechanism 33 applies support force to the engine hood 14 until the engine hood 14 reaches the position at an opening angle of roughly 60 degrees (i.e., the first opening angle) from the position at an opening angle of roughly 90 degrees (i.e., the second opening angle). On the other hand, the engine hood 14 does not receive the reaction force from the first gas springs 31 and 32. Therefore, an operator can pivot the engine hood 14 in the closing direction with small operating force.

When the engine hood 14 further reaches the position at an opening angle of roughly 60 degrees (i.e., the first opening angle), the reaction force of the first gas springs 31 and 32 thereafter acts on the engine hood 14. Further, force acts on the engine hood 14 in the closing direction by means of the weight thereof when the opening angle is less than or equal to roughly 60 degrees. Therefore, small operating force is required for the closing action of the engine hood 14.

Transition of the operating force required for an operator in gradually closing the engine hood 14 will be hereinafter explained with reference to FIG. 12(b).

As represented in the right side of the chart of FIG. 12(b), when engagement of the second end 42b of the stay main body 42 is released under the condition of the engine hood 14 opened at an opening angle of roughly 90 degrees, the engine hood 14 is automatically pivoted in the closing direction because the refection force of the spring mechanism 33 is greater than the force due to the weight of the engine hood 14. In short, the engine hood 14 is gradually closed towards the position at an opening angle of roughly 60 degrees while the operating force required for an operator is kept minus at the moment when engagement of the second end 42b of the stay main body 42 is released.

Next, when the engine hood 14 is closed to the position at an opening angle of roughly 60 degrees, the spring mechanism 33 is completely compressed and force is not applied therefrom. By contrast, the refection force of the first gas springs 31 and 32 starts acting on the engine hood 14. Therefore, it is required to gradually close the engine hood 14 with an operating force of roughly 5 kg in an opening angle range from roughly 60 degrees to roughly 40 degrees.

Finally, when the opening angle of the engine hood 14 becomes less than or equal to roughly 40 degrees, the force due to the weight of the engine hood 14 exceeds the reflection force of the first gas springs 31 and 32. Therefore, the engine hood 14 is automatically shifted to the completely closed state.

As described above, the opening/closing mechanism 20 of the engine hood 14 according to the present exemplary embodiment simultaneously use the first gas springs 31 and 32 for applying support force to the engine hood in the opening direction and the spring mechanism 33 for applying support force to the engine hood in the closing direction.

Accordingly, it is possible to apply force to the engine hood 14 in opposite directions before and after the center of mass 14a of the engine hood 14 is moved across the vertical line of the pivot center. As a result, the engine hood 14 can be smoothly opened and closed while the operating force required for an operator can be reduced regardless of the position of the center of mass 14a of the engine hood 14 even in largely pivoting and opening the engine hood 14.

Other Exemplary Embodiments

An exemplary embodiment of the present invention has been explained above. However, the present invention is not limited to the aforementioned exemplary embodiment, and a variety of changes can be herein made without departing from the scope of the present invention.

(A) The mechanism for opening and closing the engine hood 14 by the combination of the two first gas springs 31 and 32 and the single spring mechanism 33 has been exemplified in the aforementioned exemplary embodiment. In the present invention, however, the mechanism for opening and closing the engine hood 14 is not limited to the above.

For example, either a single first gas spring or three or more first gas springs and a plurality of spring mechanisms may be provided as the mechanism for opening and closing the engine hood.

Alternatively, a damper may be used instead of gas springs as the mechanism for opening and closing the engine hood.

(B) In the aforementioned exemplary embodiment, the configuration has been exemplified that the first opening angle for executing a normal maintenance work and etc. is set to be roughly 60 degrees while the second opening angle for executing a work of replacing the engine and etc. is set to be roughly 90 degrees. In the present invention, however, the configuration of opening angles is not limited to the above.

For example, each of the first and second opening angles may be respectively set to be less than or greater than the aforementioned angle.

(C) In the aforementioned exemplary embodiment, the hydraulic excavator has been exemplified as a construction machine to which the engine hood of the present invention is applied. In the present invention, however, an application of the present invention is not limited to the above. For example, the present invention can be similarly applied to an engine hood covering the engine compartment of any other type of construction machine such as a wheel loader.

The engine hood for a construction machine according to the above described embodiments of the present invention can achieve an advantageous effect of smoothly opening and closing an engine hood without increasing load acting on an operator regardless of the opening angle of the engine hood. Therefore, the engine hood is widely applicable to a variety of vehicles and etc. embedded with a variety of covers that can be opened and closed.

The invention claimed is:

1. An engine hood for a construction machine, the engine hood being configured to be pivoted in a vehicle body back-and-forth direction about a hinge attached as a pivot center to a longitudinal side part of a counterweight, the engine hood comprising:
    an engine hood main body attached to a vehicle body of the construction machine in a pivotably openable/closable state;
    a first operating force applying unit configured to apply a force in a direction of opening the engine hood main body until the engine hood main body reaches a vicinity of a predetermined opening angle;
    a second operating force applying unit configured to apply a force in a direction of closing the engine hood main body when the engine hood main body is pivoted at the predetermined opening angle or greater,
    a first opening angle being defined as an opening angle for pivoting the engine hood main body to a predetermined position where a center of mass of the engine hood main body is positioned on a closing side of the engine hood main body with respect to a vertical line of the pivot center, and a second angle is being defined as an opening angle for pivoting the engine hood main body from the first opening angle to a predetermined position where the center of mass of the engine hood main body is moved across the vertical line of the pivot center,
    the engine hood main body being configured to be opened in two stages including a first stage corresponding to opening angles ranging from a close state of the engine hood main body to the first opening angle and a second stage corresponding to opening angles ranging from the first opening to a second opening angle greater than the first opening angle, and
    the second operating force applying unit being configured such that the second operating force applying unit does not apply an operating force against the engine hood main body during the first stage.

2. The engine hood for a construction machine recited in claim 1, wherein
    the first opening angle is roughly 60 degrees and the second opening angle is roughly 90 degrees.

3. The engine hood for a construction machine recited in claim 1, further comprising:
    a support member configured to support the engine hood main body at the first opening angle and the second opening angle, wherein
    the support member is configured to support difference between weight of the engine hood main body and force applied to the engine hood main body from the first operating force applying unit at the first opening angle, and
    the support member is configured to support difference between the weight of the engine hood main body and force applied to the engine hood main body from the second operating force applying unit at the second opening angle.

4. The engine hood for a construction machine recited in claim 1, wherein the first operating force applying unit is configured such that the first operating force applying unit does not apply an operating force against the engine hood main body during the second stage.

5. The engine hood for a construction machine recited in claim 1, wherein the first operating force applying unit includes a gas spring.

6. An engine hood for a construction machine, the engine hood being configured to be pivoted in a vehicle body back-and-forth direction about a hinge attached as a pivot center to a longitudinal side part of a counterweight, the engine hood comprising:

an engine hood main body attached to a vehicle body of the construction machine in a pivotably openable/closable state such that the engine hood main body is opened in two stages of a first opening angle and a second opening angle greater than the first opening angle, the first opening angle being defined as an opening angle for pivoting the engine hood main body to a predetermined position where a center of mass of the engine hood main body is positioned on a closing side of the engine hood main body with respect to a vertical line of the pivot center, and the second opening angle being defined as an opening angle for pivoting the engine hood main body from the first opening angle to a predetermined position where the center of mass of the engine hood main body is moved across the vertical line of the pivot center;

a first operating force applying unit configured to apply force in a direction of opening the engine hood main body until the engine hood main body reaches a vicinity of a predetermined opening angle;

a second operating force applying unit configured to apply force in a direction of closing the engine hood main body when the engine hood main body is pivoted at the predetermined opening angle of greater;

a support member configured to support the engine hood main body in the two stages of the first opening angle and the second opening angle; and a guide part including a guide groove along which a part of the support member is moved in conjunction with a pivot of the support member, an end of the support member being coupled to a step, and the step being disposed astride an upper opening of an engine compartment in a vicinity of a center part of the upper opening in a width direction, the guide part being disposed on a back surface side of the engine hood main body while being disposed in a vicinity of a roughly center part of the engine hood main body in the width direction, and the guide part including a first guide groove along which the part of the support member is moved in opening the engine hood main body from a closed state to the first opening angle;

a second guide groove to which the part of the support member is moved from the first guide groove, the second guide groove locking the part of the support member at around the first opening angle; and a third guide groove along which the part of the support member is moved in opening the engine hood main body from the first opening angle to the second opening angle, the third guide groove locking the part of the support member at the second opening angle.

7. An engine hood for a construction machine, the engine hood being configured to be pivoted in a vehicle body-and forth direction about a hinge attached as a pivot center to a longitudinal side part of a counterweight, the engine hood comprising:

an engine hood main body attached to a vehicle body of the construction machine in a pivotably openable/closable state such that the engine hood main body is opened in two stages of a first opening angle and a second opening angle greater than the first opening angle, the first opening angle being defined as an opening angle for pivoting the engine hood main body to a predetermined position where a center of mass of the engine hood main body is positioned on a closing side of the engine hood main body with respect to a vertical line of the pivot center, and the second opening angle being defined as an opening angle for pivoting the engine hood main body from the first opening angle to a predetermined position where the center of mass of the engine hood main body is moved across the vertical line of the pivot center;

a link member disposed on a step that is arranged astride an upper opening of an engine compartment in a vicinity of a center part of the upper opening in a width direction;

a first operating force applying unit configured to apply force in a direction of opening the engine hood main body until the engine hood main body reaches a vicinity of a predetermined opening angle; and a second operating force applying unit configured to apply force in a direction of closing the engine hood main body when the engine hood main body is pivoted at the predetermined opening angle or greater, the second operating force applying unit being disposed on a back surface side of the engine hood main body in a vicinity of a roughly center part of the engine hood main body in a width direction, and including a tube and a rod allowed to be extended and contracted with respect to the tube, an end of the tube being coupled to a fixation part that is disposed on an inner surface of the engine hood main body, and the link member being coupled to an end of the rod.

* * * * *